US006795241B1

(12) United States Patent
Holzbach

(10) Patent No.: US 6,795,241 B1
(45) Date of Patent: Sep. 21, 2004

(54) DYNAMIC SCALABLE FULL-PARALLAX THREE-DIMENSIONAL ELECTRONIC DISPLAY

(75) Inventor: Mark E. Holzbach, Austin, TX (US)

(73) Assignee: Zebra Imaging, Inc., Pflugerville, TX (US)

( * ) Notice: Subject to any disclaimer, the term of this patent is extended or adjusted under 35 U.S.C. 154(b) by 0 days.

(21) Appl. No.: 09/457,013

(22) Filed: Dec. 8, 1999

Related U.S. Application Data

(60) Provisional application No. 60/111,906, filed on Dec. 10, 1998.

(51) Int. Cl.[7] .............................................. G02B 27/22
(52) U.S. Cl. .............................. 359/463; 348/51; 353/7
(58) Field of Search ................................ 359/462, 463, 359/466–469; 348/51, 52, 54, 59; 352/57, 58, 60, 61; 353/7; 345/6

(56) References Cited

U.S. PATENT DOCUMENTS

| 3,852,524 | A |   | 12/1974 | Ando et al. ................... 178/6.5 |
| 4,492,442 | A |   | 1/1985  | Gaudyn ........................ 353/10 |
| 5,340,978 | A |   | 8/1994  | Rostoker et al. ......... 250/208.1 |
| 5,428,366 | A |   | 6/1995  | Eichenlaub ................. 345/102 |
| 5,500,765 | A |   | 3/1996  | Eichenlaub ................. 359/463 |
| 5,823,344 | A |   | 10/1998 | Fantone et al. .......... 206/459.5 |
| 5,883,739 | A | * | 3/1999  | Ashihara et al. ............ 359/462 |
| 5,926,318 | A |   | 7/1999  | Hebert ........................ 359/618 |
| 5,973,844 | A |   | 10/1999 | Burger ........................ 359/622 |
| 5,982,342 | A | * | 11/1999 | Iwata et al. ................. 359/462 |
| 6,008,484 | A | * | 12/1999 | Woodgate ................... 359/466 |

FOREIGN PATENT DOCUMENTS

WO    WO 94/06249    3/1994

OTHER PUBLICATIONS

Underkoffler, John Stephen, "The I/O Bulb and the Luminous Room," graduate thesis submitted to Massachusetts Institute of Technology, Feb. 1999, 88 pages.
Holzbach, Mark E., "Small Business Innovation Research (SBIR) Program Proposal," submitted to U.S. Department of Defense Jun. 28, 1996, 18 pages.
Ives, Herbert E., "Optical Properties of a Lippmann Lenticulated Sheet," J. Opt. Soc. Amer. 21, Mar., 1931, pp. 171–176.
Holzbach, Mark E., "Three–dimensional Image Processing for Synthetic Holographic Stereograms," Master's thesis submitted to Massachusetts Institute of Technology, Sep. 1986, 55 pages.

* cited by examiner

Primary Examiner—Mark A. Robinson
Assistant Examiner—Alessandro Amari
(74) Attorney, Agent, or Firm—Campbell Stephenson Ascolese LLP

(57) ABSTRACT

A system and method are provided to form a large scale full-parallax three-dimensional electronic display. Multiple lenslet pixel modules are preferably formed by combining a high resolution two-dimensional image sources with respective lenslets. For some applications each pixel module has a respective two-dimensional high resolution image source. For other applications two or more lenslet pixel modules may use respective portions of the same high resolution two-dimensional image source. One or more computer processing units may be used to provide video images or graphical image data to the high resolution two-dimensional image sources. For some electronic displays, the lenslet pixel modules form an array of projectors and an array of sensors may be disposed within the array of projectors. The array of sensors may cooperate with the array of projectors to allow interaction between one or more observers and a three-dimensional image produced by the projector array.

32 Claims, 6 Drawing Sheets

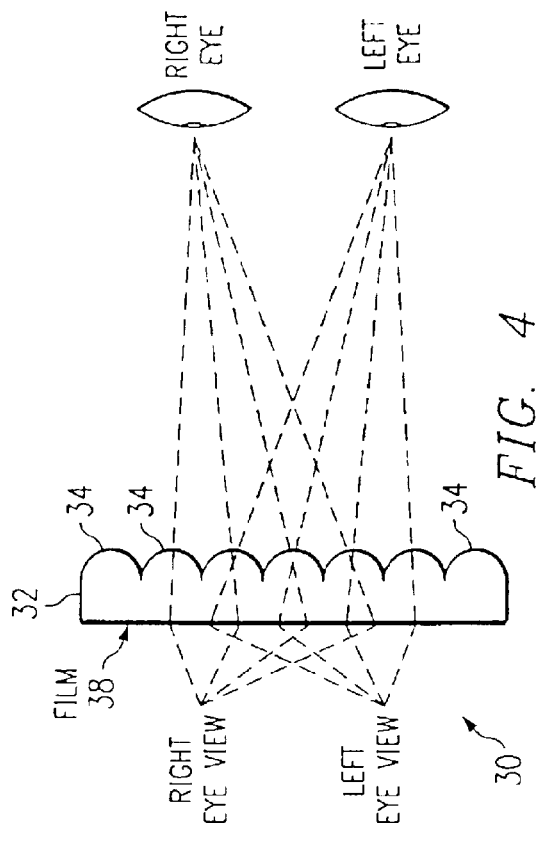
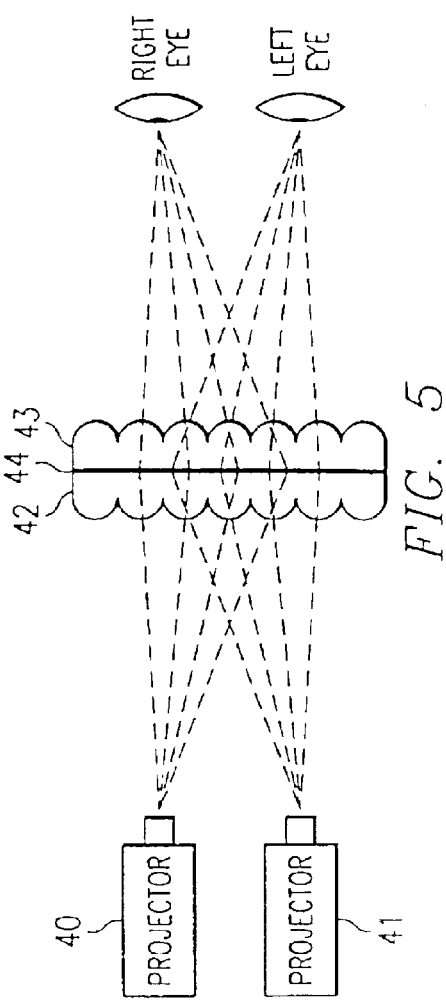
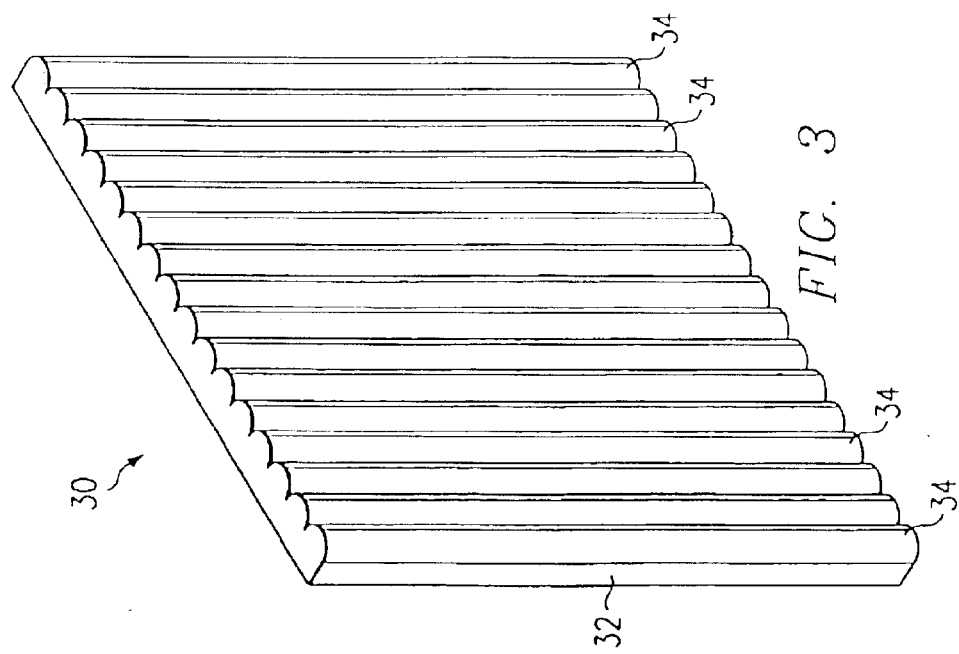

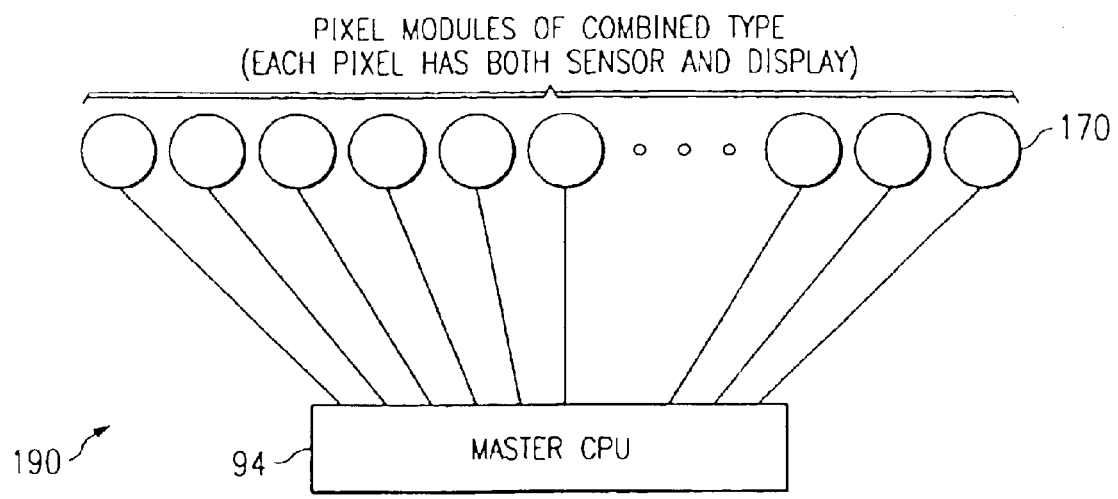
FIG. 14
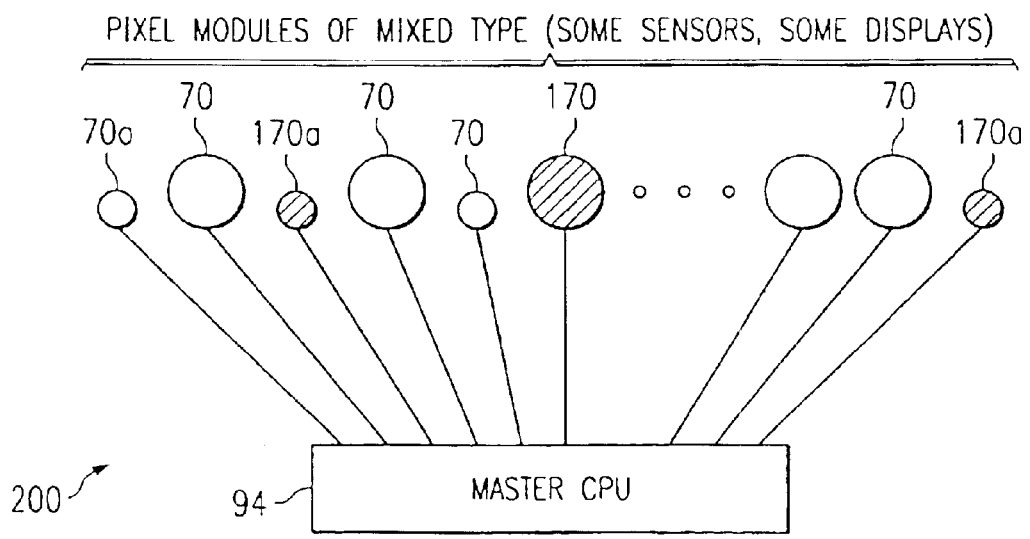
 = HIGHER RESOLUTION IMAGE SENSOR MODULE
 = LOWER RESOLUTION IMAGE SENSOR MODULE
 = HIGHER RESOLUTION IMAGE DISPLAY MODULE
 = LOWER RESOLUTION IMAGE DISPLAY MODULE
FIG. 15

DYNAMIC SCALABLE FULL-PARALLAX THREE-DIMENSIONAL ELECTRONIC DISPLAY

RELATED PATENT APPLICATION

This application claims the benefit of U.S. Provisional Application No. 60/111,906, filed Dec. 10, 1998 and entitled "Dynamic Scalable Full-Parallax Three-Dimensional Electronic Display".

TECHNICAL FIELD OF THE INVENTION

The present invention relates in general to large scale autostereoscopic displays and, more particularly, to a system and method which uses lenslet pixel modules to provide a dynamic, scalable, full-parallax three-dimensional electronic display.

BACKGROUND OF THE INVENTION

The use of computers to assist in three-dimensional (3D) information design, visualization, and analysis is revolutionizing the communication of 3D information, especially through the emergence of the "virtual reality" paradigm. At present people can interactively experience 3D information using a computer interface which usually requires wearing special glasses or a helmet incorporating goggles. These kinds of solutions are problematic in their unnatural obtrusiveness and difficulty in simultaneous participation of a group or large audience.

Fly's eye lens sheets and related techniques were developed decades ago using optics and photographic technology. Fly's eye lens sheets possess many desirable qualities for use in 3D display such as autostereoscopy, high-resolution, full-color, high light efficiency (brightness), full-parallax (both horizontal and vertical depth information), and wide viewing angle (up to about forty-five (45) degrees). Such displays often include a fly's eye lens sheet having a two-dimensional array of low f-number lenslets which are positioned in front of one or more two-dimensional (2D) images. The 2D image or images are projected into space by the fly's eye lens sheet. The sum of all rays of light projected from the lenslets approximates the directions and intensities of light rays coming from a real 3D object or scene corresponding with the 2D image or images.

Fly's eye lens sheets are often considered functionally analogous to lenticular lens sheets which are typically 2D arrays of semi-cylindrical lenslets used in creating 3D images with horizontal parallax only. The resulting lenticular displays have enjoyed more popularity than displays using fly's eye lens sheets primarily because lenticular lens sheets are technically easier to create. The application of lens sheet techniques to electronic displays is still in an early development stage. Typically, only lenticular lens sheet methods have even been commercially attempted, and only with relatively low resolution displays capable of presenting stereo-image pair views to an observer at a strictly proscribed viewing distance and head positions. Large 3D electronic displays having fly's eye lens sheets have generally not been considered due to associated costs and difficulty in manufacture and assembly of the display.

There has been previous discussions about developing an optical input/output system having "projection pixels" with one or more "camera pixels" interleaved within the array of projection pixels. See for example "The I/O Bulb And The Luminous Room" prepared by John Stephen Underkoffler published during February 1999 as partial fullfillment the requirements for a doctoral degree from Massachuset Institute of Technology.

SUMMARY OF THE INVENTION

In accordance with teachings of the present invention a system and method are provided to produce a scalable, 3D electronic display having a plurality of lenslet pixel modules. For some applications the display will produce a full parallax image. However, a 3D electronic display incorporating teaching of the present invention may be used to produce horizontal parallax only or vertical parallax only images. Each lenslet pixel module is designed in accordance with teaching of the present invention for optimal viewing characteristics such as wide output balanced with practical characteristics such as robustness and ease of manufacture. For one application, a large electronic display may be formed with as many of lenslet pixel modules as necessary to satisfy a given size or element resolution requirement. Fly's eye lens sheets may be used to form part of each lenslet pixel module. The modular approach of the present invention has many benefits related to image quality, flexibility, and reduced cost.

One aspect of the present invention preferably includes using image display software within an electronic display to provide an independent 3D digital moving image transmission format along with a central control computer for producing and distributing appropriate image information to associated lenslet pixel modules. In addition, a sensor such as a charge coupled device (CCD) can be incorporated into some or all of the lenslet pixel modules so that the resulting 3D electronic display may function as a 3D camera as well as a 3D display. For other applications, the 3D display may include an array of sensor elements interspersed with an array of lenslet pixel modules as opposed to combining sensor elements within respective lenslet pixel modules. For still other applications, there may be a combination of sensor/projector elements, sensor-only elements and projector-only elements as desired for each specific electronic display.

Technical benefits of the present invention include providing autostereoscopic displays which are tailored to the human visual system in characteristics such as resolution and ergonomic ease of use. Technical benefits of such autostereoscopic displays also include presenting 3D information to an individual or group of observers using computer mediated 3D communications in accordance with teachings of the present invention without requiring each observer to wear special goggles or glasses.

Forming an electronic display using one or more fly's eye lens sheets in accordance with teachings of the present invention provides vertical parallax information which may be very important when it is desirable to view an image from a variety of distances without distortions and when it is desirable to change an observer's vertical position relative to the display in order to view the associated image from different vertical positions. Fly's eye lens sheet designs are generally more scalable in resolution and size due to the inherently symmetrical and compact lenslets. Fly's eye lens sheets generally produce a more realistic, less distorting and easier to view 3D image as compared to a lenticular type display.

The present invention allows using high resolution 2D image sources such as miniature cathode ray tubes (CRTS), liquid crystal displays (LCDs), digital micro device (DMD) mirrors, microelectronicmechanical systems (MEMS) and charge coupled device (CCD) sensors to provide a 2D image at each lenslet pixel module of a 3D electronic display at a reasonable cost. A wide variety of light valves and/or light modulators may be satisfactorily used to provide the desired 2D image preferably in a digital format to each lenslet pixel module. Some of these images sources may be low resolution.

Computer control systems and software may be used to provide an image production and distribution system which presents the desired 2D image behind each lenslet pixel module at a desired frame rate. Miniature CRTS, LCDs, CCD sensors, and other high resolution light valves and light modulators have all recently reached an adequate level of miniaturization and developed into commodities with costs decreasing at a constant rate such that a fly's eye lens sheet and multiple high resolution 2D image sources may be combined to form a dynamic 3D image display.

Other technical benefits and advantages will be apparent to one of ordinary skill in the art after reviewing the specification, drawings and claims.

BRIEF DESCRIPTION OF THE DRAWINGS

A more complete understanding of the present invention and advantages thereof may be acquired by reviewing the following descriptions taken in conjunction with the accompanying drawings, in which like reference numbers indicate like features, and wherein:

FIG. 3 is a schematic drawing showing an isometric view of a portion of a lenticular screen display;

FIG. 4 is a schematic drawing showing a plan view of the lenticular screen display of FIG. 3;

FIG. 5 is a schematic drawing showing a plan view of another lenticular screen display having a first lenticular lens sheet and a second lenticular lens sheet with a diffused surface disposed therebetween;

FIG. 14 is a schematic drawing with portions broken away of a display system having multiple lenslet pixel modules which include both projector elements and sensor elements incorporating teachings of the present invention; and FIG. 15 is a schematic drawing with portions broken away showing still another display system having a selected number of lenslet pixel modules with high resolution and low resolution sensor elements and a selected number of lenslet pixel modules with a high resolution image display elements and low resolution image display elements.

DETAILED DESCRIPTION OF THE INVENTION

Figure 1:
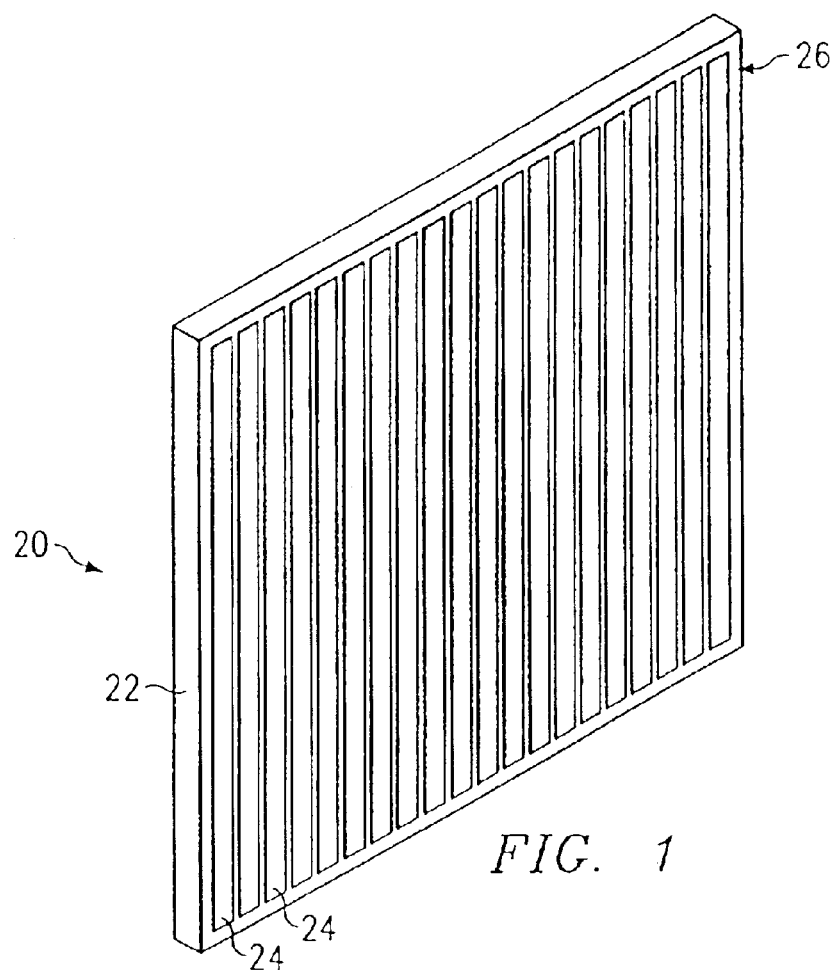
FIG. 1 is a schematic drawing showing an isometric view of a portion of a parallax barrier screen display.

Preferred embodiments of the present invention and its advantages are best understood by reference to FIGS. 1–15 of the drawings, like numerals being used for like and corresponding parts of the various drawings.

The following written description discusses various embodiments of a scalable, full-parallax 3D electronic display formed in accordance with teachings of the present invention. The description begins with a brief explanation of two similar technologies for providing autostereoscopic 3D image displays: parallax barrier displays and lenticular lens sheet displays. The description includes a comparison of lenticular lens sheet displays with fly's eye lens sheet displays and the benefits resulting using a fly's eye lens sheet to form a display in accordance with teachings of the present invention. A single lenslet pixel module having a fly's eye lens is described, followed by a discussion of some parallel signal distribution techniques to enhance the resulting 3D electronic display. The description concludes with examples of optional image acquisition hardware and software modifications.

Pixel is an abbreviation for picture element. For purposes of describing various features of the present invention, the term "3D pixel" will be used to refer to the smallest part of an electronically coded 3D graphic or 3D picture image. Pixel may also be used to refer to the smallest addressable element in an electronic display. Conventional LCD Projectors and CCD sensors typically have an array of 2D pixels. The present invention provides an electronic display which produces a 3D image having 3D pixels.

The terms "lenslet pixel module" and "lenslet pixel modules" are used to describe various components such as high resolution and low resolution 2D image sources, fly's eye lenslets and/or a sensor elements which may be combined in accordance with teachings of the present invention to form a 3D pixel in a resulting autostereoscopic image and/or detect a portion of a real 3D object. Various features of the present invention may be described with respect to "projector pixels" which form a portion of an electronic display and "sensor pixels" which detect electromagnetic radiation from one or more real 3D objects or from a scene adjacent to the electronic display.

The terms "projector module" or "projector modules" are used to refer to lenslet pixel modules which form a 3D pixel in a resulting autostereoscopic image. The terms "sensor module", "detector module", "sensor modules" and "detector modules" are used to describe lenslet pixel modules which are responsive to electromagnetic radiation from a real 3D object or a real scene adjacent to an electronic display incorporating teachings of the present invention.

The term "high resolution" is used to refer to a 2D image source and to a sensor element having a 2D array of at least 1280 by 1024 pixels.

Various embodiments of the present invention will be described with respect to lens sheets and lenslets satisfactory for use in forming 3D displays incorporating teachings of the present invention. These lens sheets and lenslets may be formed from a wide variety of optically transparent materials such as plastics and glass. Lens sheets and lenslets are often formed using injection molding techniques. Commercially available optical design and fabrication methods may be used to form various components of an electronic display incorporating teachings of the present invention. Also, the selection of various optical elements, their respective locations and optical characteristics such as aperture, diameter and focal length may be determined in accordance with commercially available techniques associated with digital electronic and holographic displays.

A basic characteristic distinguishing an autostereoscopic display from a 2D display is that an autostereoscopic display can generally control both light intensity and light directions emanating therefrom whereas a 2D display only modulates light intensity. A 2D photograph or a 2D television set is perceived as a flat surface because the image surface diffuses light indiscriminately, whereas autostereoscopic displays appear 3D because the observer's two eyes are presented with two different viewpoint-dependent images. The most natural kinds of autostereoscopic displays allow an observer to move around within a wide range of viewing positions, always presenting the correct information to the observer's eyes.

Parallax Barrier Displays

Figure 2:
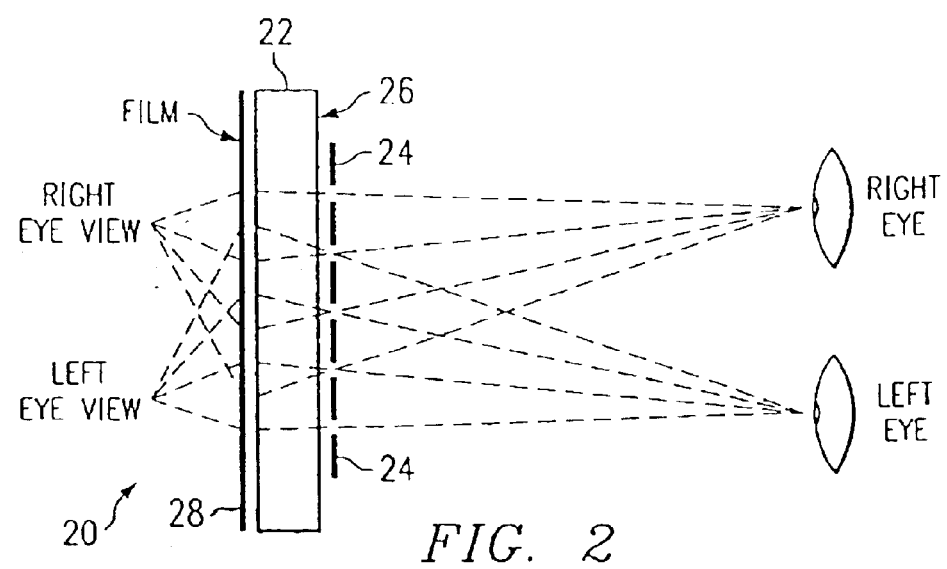
FIG. 2 is a schematic drawing showing a plan view of the parallax barrier screen display of FIG. 1.

FIGS. 1 and 2 are schematic diagrams showing one example of a typical parallax barrier screen display indicated generally at 20. A parallax barrier screen display such as display 20 generally includes a transparency or sheet 22 with fine parallel vertical opaque lines 24 which are placed at a defined distance in front of a specially prepared picture or film 28 as shown in FIG. 2. Sheet 22 and opaque lines 24 cooperate with each other to form parallax barrier screen 26. Specially prepared picture or film 28 disposed adjacent to parallax barrier screen 26 generally includes 2D images (not expressly shown) from different viewpoints which are positioned in fine strips behind lines 24 of parallax barrier screen 26 such that only the appropriate strips are visible from a particular viewing angle. FIG. 2 is a diagram of a top down view of one embodiment of parallax barrier screen display 20.

The parallax barrier screen technique has a set of advantages and disadvantages compared to alternative techniques. Because of the offset printing industry's need for high-resolution, high-contrast black-and-white photographic transparencies used in producing printing plates, it is possible to inexpensively produce large raster barrier screens of any desired barrier pattern up to 2400 lines-per-inch. The essential drawbacks to faster barrier screen displays are in the unavoidable darkening of the image caused by the opaque barrier strips, and by the difficulties of registering the barrier screen with the specially prepared 2D image or images disposed adjacent thereto. The use of a lightbox (not expressly shown) to back illuminate a raster barrier screen can result in adequately bright images for certain viewing situations.

Lenticular Screen and Fly's Eye Screen Displays

A lenticular screen display is geometrically similar to a parallax barrier screen display. The relationship between the two types of displays is analogous to the relationship of a pin-hole camera to a normal convex lens camera. A lenticular screen display is analogously much more light efficient than a parallax barrier screen display.

FIGS. 3 and 4 are schematic diagrams showing one example of a lenticular screen display indicated generally at 30. A principle advantage of a lenticular screen display such as display 30 is its superior optical efficiency or brightness compared to a parallax barrier display.

For the example shown in FIGS. 3 and 4 lenticular screen display 30 preferably includes lenticular lens sheet 32 have a plurality of parallel, vertical lenticules 34 formed on one surface thereof. A specially prepared picture or film 38 may be disposed adjacent to lenticular lens sheet 32 opposite from lenticules 34 as shown in FIG. 4. Picture or film 38 preferably includes one or more 2D images which will be projected from lenticular lens sheet 32 as a horizontal parallax only 3D image.

Some disadvantages of a lenticular screen display are the difficulties and costs in designing and producing a good lenticular lens sheet with minimal aberrations. Another disadvantage is the problem of displaying lenticular images in outdoor situations where sunlight may be concentrated by the associated lenticules on the 2D image plane behind the lenticules and cause damage to the picture or film having the 2D image. Both parallax barrier screen displays and lenticular screen displays unavoidably suffer from diffraction limited resolution related to the width of the parallax barrier slits or the lenticules in the case of a lenticular screen display.

In order to display moving images, the static 2D image behind the parallax barrier screen or behind the lenticular screen may be replaced by a moving image screen or moving image source with specially prepared images composed of fine vertical strip images carefully matched to the geometrical design of the parallax barrier screen or lenticular screen. It is possible to generate these special moving images by real-time parallel computer processing of conventional video output from a line of video cameras (not expressly shown) or from synthesized views of a computer graphics animation rendering engine (not expressly shown). Alternatively, it is possible to optically process and combine rear-projected images using two or more projectors 40 and 41 along with lenticular lens sheets 42 and 43 with diffusing surface 44 disposed therebetween as shown in FIG. 5.

Parallax barrier screen display 20 and lenticular screen display 30 are horizontal parallax only displays. These displays may be modified to full parallax displays by replacing parallax barrier sheet 22 or lenticular lens sheet 32 with a pinhole array and a fly's eye lens sheet respectively.

Figure 7:
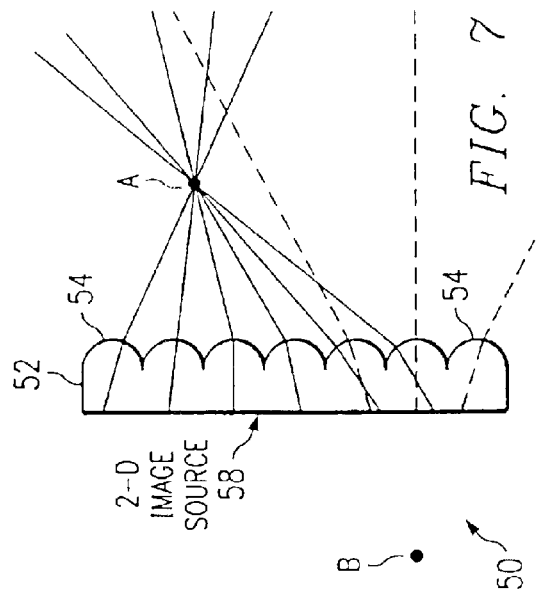
FIG. 7 is a schematic drawing showing a plan view of the display screen of FIG. 6.
Figure 6:
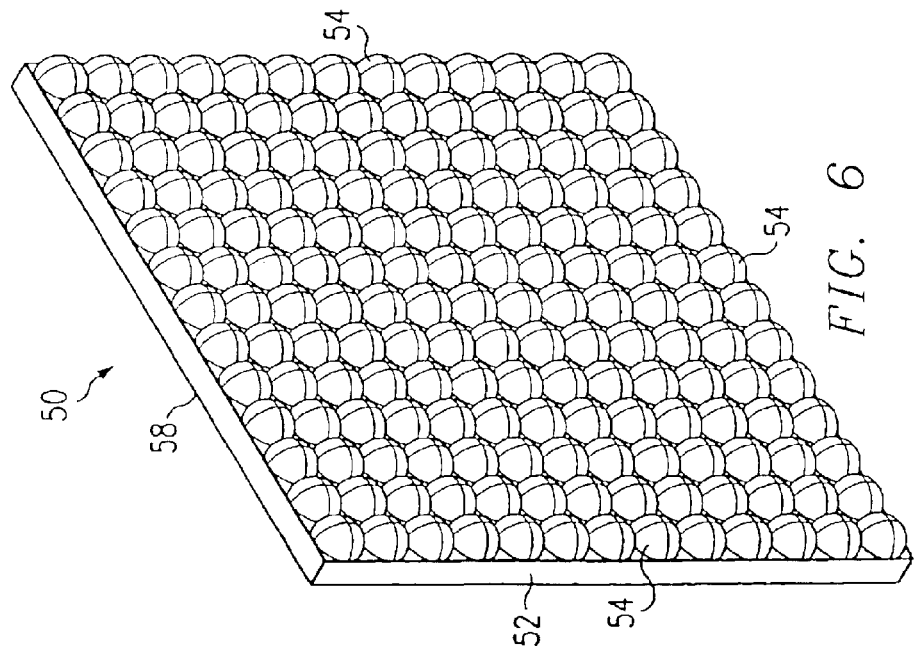
FIG. 6 is a schematic drawing showing an isometric view of a display screen formed in part by a fly's eye lens sheet.

FIGS. 6 and 7 are schematic drawings showing one example of a typical fly's eye screen display shown generally at 50. A fly's eye screen display such as display 50 generally includes a fly's eye lens sheet 52 having an array of fly's eye lenslets 54 disposed on one surface thereof. The opposite surface of a fly's eye lens sheet 52 is preferably flat and smooth. Fly's eye lenslets 54 may be described as generally spherical bumps.

Two-dimensional image source 58 is preferably disposed on fly's eye lens sheet 52 opposite from lenslets 54. Two-dimensional image source 58 may be a picture or film as previously described with respect to lenticular screen display 30. For some application 2D image source 58 may be a moving image screen or other moving image source.

Full parallax displays such as display 50 provide more realistic 3D images as compared to horizontal parallax only displays such as displays 20 and 30. The difference is most apparent when an observer moves in a vertical direction relative to the displays. Another benefit of a full parallax display is in the freedom it allows an observer to view a display from any distance without observing the anamorphic distortions which are inherent in horizontal parallax only displays. The reason for these anamorphic distortions in lenticular displays such as display 30 is the fact that the vertical dimension of the images behind lenticules 34 is fixed. The relative sizes of objects in the real world change with the viewing distance. Since the vertical dimension of objects in lenticular display 30 is fixed, there can only be one viewing distance for which the vertical dimensions of the resulting 3D image are correct.

Image information can appear both in front and behind fly's eye screen display 50 as shown in FIG. 7. FIG. 7 shows a cross-section of fly's eye screen display 50 where point A is imaged in front of display 50 and point B appears to be behind display 50 simply due to the apparent convergence of the rays projected by fly's eye lenslets 54. Image points which are recorded on 2D image source 58 disposed behind lenslets 54 are refracted by lenslets 54 and emerge in directions consistent with light from a corresponding real 3D object or scene.

One method for creating synthetic 2D images for a fly's eye screen display can be inferred from FIG. 7, namely computer graphic ray tracing. Unfortunately, creating real-world images is more complicated due to a peculiar depth inversion problem which is briefly described below.

Figure 8:
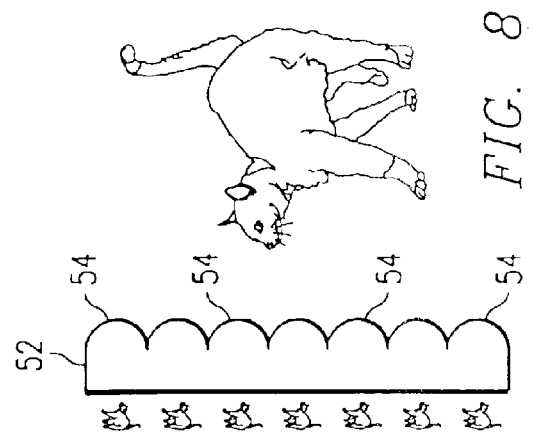
FIG. 8 is a schematic drawing showing a side view of a fly's eye lens sheet used to record an image on photosensitive recording material.

FIG. 8 depicts a side view of a model of a cat placed in front of fly's eye lens sheet 52. For purposes of explanation a layer of photosensitive recording material may be placed on lens sheet 52 at the surface previously occupied by 2D image source 58. Lenslets 52 appear to image the cat as one would expect from the laws of optics, namely a small inverted image of the cat from the perspective of each lenslet is imaged behind it on the photosensitive recording material at the 2D image source plane. Since the cat is facing fly's eye lens sheet 52, each lenslet 54 images a front view of the cat. When the photosensitive recording material is developed and placed exactly back in the same position it was in during exposure, a reconstructed image of the cat will be presented, as the laws of optics would predict, in front of fly's eye lens sheet 52.

The peculiar problem becomes evident when an observer tries to view the image from the front. When observed with a single eye from any stationary position, the cat appears normal, but when observed with both eyes, the 3D image is observed to be inverted in depth relative to the observer, with the cat's nose farther from the observer than it's tail. This problem associated with lens-sheet recordings was first noted by H. E. Ives in "Optical Properties of a Lippman Lenticulated Sheet," J. Opt. Soc. Amer. 21, Mar. 1931.

Ives' solution to this problem was to re-record the depth-inverted lens-sheet image in order to correct the depth. This approach was effective in correcting this problem, but it introduced additional noise in photographic processes, second-generation optical aperture-sampling artifacts, and other noise and artifacts due to compounded lenslet aberrations and diffraction.

In a digital implementation the solution can be much more elegant. Conventionally rendered computer graphics images or real-world images acquired with a digital camera (not expressly shown) or other suitable sensor can be systematically inverted to correct the problem. The algorithm used can be a variation of an algorithm developed, which was the subject of a masters' degree thesis by M. Holzbach, "Three-dimensional Image Processing for Synthetic Holographic Stereograms," MIT Master's Thesis, September, 1986.

Lenslet Pixel Modules

There are several objective characteristics for evaluating 3D displays. One obvious characteristic is the 2D image plane pixel resolution which is simply the number of lenslet pixel modules in a horizontal and vertical direction, and their spacing. This resolution is all one eye can appreciate from a single position in front of the display.

Another measure of image quality of 3D images is depth resolution which depends on factors such as lenslet size and quality and image resolution behind each lenslet. Depth resolution for a fly's eye screen is not constant regardless of distance from the screen. Due to physical optical limits such as diffraction and the effects of lens aberrations and image misregistrations (which increase at a distance), depth resolution is best for points close to the screen (on the order of the lenslet size) and decreases with the distance from the screen. Complete analysis of depth resolution during lenslet design phase is preferably conducted as part of forming a 3D electronic display in accordance with teachings of the present invention to optimize lenslet pixel module design to yield the best possible depth resolution.

The image information for a fly's eye screen display originates on the source image plane behind the lenslets. If the 2D image source plane is positioned at the focal length of the lenslets, a point on the 2D image source plane behind a lenslet becomes a collimated (parallel light) beam which appears to completely fill the lenslet when observed at the correct angle relative to the lenslet. When the observed angle relative to the lenslet changes slightly, a neighboring image point from the 2D image source plane appears to completely fill the lenslet. From this it can be seen how the size and density of neighboring image points on the 2D image source plane are directly related to depth resolution.

A high resolution 2D image source, such as a miniature CRT or LCD screen, behind each lenslet is often desirable to optimize the depth resolution. However, a less-costly lower resolution alternative may also be achieved by positioning multiple neighboring lenslets to share dedicated regions of a single CRT or LCD screen, or sections of a diffuser back-lit by a video projection system (not expressly shown). As noted later in this written description, a wide variety of light valves and light modulators may be satisfactorily used with lenslet pixel modules incorporating teachings of the present invention. Although high resolution 2D image sources are preferred, a 3D electronic display may be formed in accordance with teachings of the present invention using low resolution 2D image sources. Also, a wide variety of electromagnetic sensor and detectors may be satisfactorily used with lenslet pixel modules incorporating teachings of the present invention.

If the 2D image source positioned directly in front of one lenslet is not obstructed from the aperture of a neighboring lenslet, it is possible that light from the neighboring 2D image source will cross though it at a steep angle. To an observer, the combined result when viewing the entire display is a repeat or "flip" of the 3D image observed at angles greater than the originally intended viewing angle. This type of image "flip" can be considered a convenient way of allowing the display to be seen over an increased viewing angle, but it also distorts the image. Whether or not "flip" is considered an advantage or a disadvantage depends on the particular user application. If undesirable, "flip" can be eliminated by designing image blocking surfaces (not expressly shown) between the lenslets to block the 2D image source from neighboring lenslets from cross over.

Figure 9:
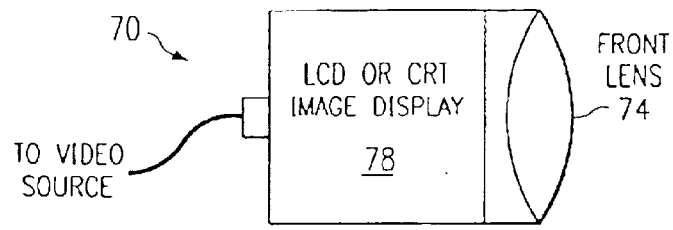
FIG. 9 is a schematic drawing with portions broken away of a single lenslet pixel module incorporating teachings of the present invention for use in a 3D electronic display.

FIG. 9 is a schematic diagram showing one embodiment of single lenslet pixel module 70 incorporating teachings of the present invention. Lenslet pixel module 70 preferably includes fly's eye lenslet 74 so that a 2D image may be projected from high resolution 2D image source 78 through fly's eye lenslet 74. Other types of lenslets satisfactory for use in forming a portion of a 3D image may be used. The present invention is not limited to fly's eye lenslet 74. Lenslet pixel module 70 may sometimes be referred to as a projection module or a projection pixel.

Various types of commercially available light valves and light modulators may be satisfactorily used as high resolution 2D image source 78. For the embodiment shown in FIG. 9, high resolution 2D image source 78 may be a digital flat panel display (FPD), an LCD or CRT. Other types of high resolution 2D image sources include light emitting diodes (LED). DMD mirrors and MEMS may also be satisfactorily used to form lenslet pixel modules 70.

A plurality of lenslet pixel modules 70 may be arranged relative to each other in a generally rectangular array to provide an electronic 3D display (not expressly shown) having a resolution of 640×480 3D pixels. The front of such an array may look similar to display 50 in FIG. 6. For some applications, fly's eye lenslet 74 may have a diameter less than one inch.

A standard video source (not expressly shown) such as NTSC or VGA may be connected to high resolution 2D image source 78. For other applications, digital data may be supplied to high resolution 2D image source 78 which then converts the digital data into the desired 2D image. An important aspect of the present invention includes providing moving images or even live images to lenslet pixel modules 70.

A 3D electronic display may be formed in accordance with teachings of the present invention by using fly's eye lens sheet 52 as shown in FIG. 6 to form a generally rectangular, flat array. For other applications lenslet pixel modules 70 may be used to form a generally curved array (not expressly shown). Lenslet pixel modules incorporating teachings of the present invention may be arranged in a wide variety of arrays and/or mosaics as desired to provide the resulting full parallax 3D image.

A plurality of high resolution 2D image sources may be coupled with respective fly's eye lenslet 54 to form the desired lenslet pixel module array. For other applications two or more lenslets 74 may share dedicated regions of the same high resolution 2D image source 78 (not expressly shown). For example a high resolution FPD may be combined with fly's eye lens sheet 52 in accordance with teachings of the present invention.

Figure 10:
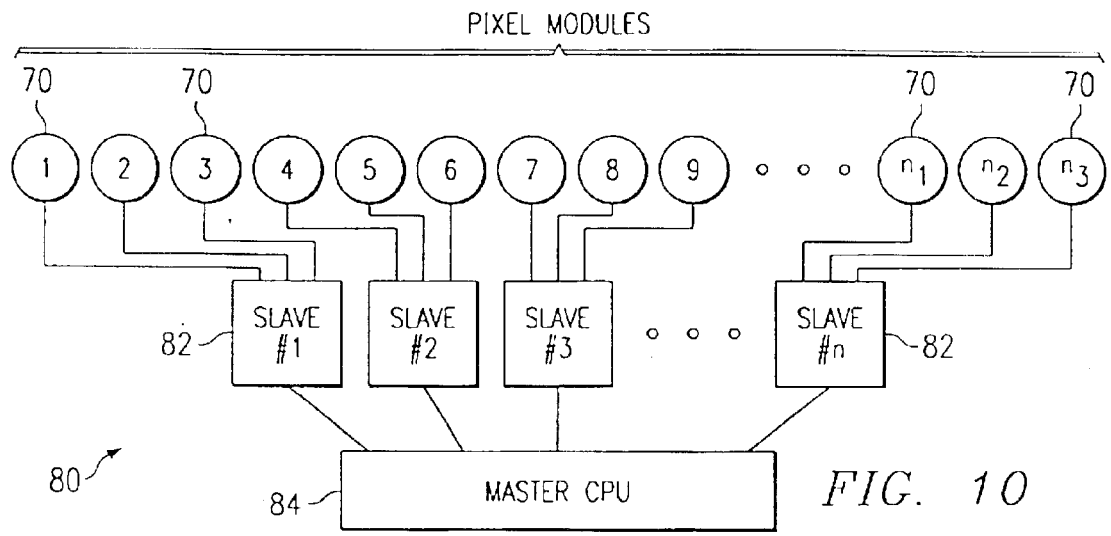
FIG. 10 is a schematic drawing with portions broken away of a display system having a multiple lenslet pixel modules incorporating teachings of the present invention.

FIG. 10 is a schematic drawing showing system 80 incorporating teachings of the present invention for presenting a scalable, full parallax autostereoscopic image. System 80 preferably includes a plurality of lenslet pixel modules 70 which may be arranged relative to each other in a wide variety of arrays or mosaics. For one example lenslet pixel modules 70 may be arranged to form an array similar to display 50 as shown in FIG. 6. For other applications lenslet pixel module 70 may be arranged in various geometric configurations such as concave, convex, rectangular, square or cylindrical.

System 80 also includes a plurality of slave computer processing units (CPU) 82 with one or more lenslet pixel modules 70 coupled with each slave CPU 82. Depending upon the type of light valve or light modulator used to form lenslet pixel module 70, a video output channel may be used to couple each slave CPU 82 with its associated lenslet pixel modules 70. For other applications each slave CPU 82 may have a digital connection with its associated lenslet pixel module 70. Digital data from each slave CPU 82 may be converted to the desired 2D image by high resolution 2D image source 78.

System 80 preferably includes master computer processing unit (CPU) 84 which is preferably connected with and controls the operation of each slave CPU 82. For the embodiment shown in FIG. 10, three lenslet pixel modules 70 are coupled with each slave CPU 82. However, the number of slave CPUs, master CPUs and lenslet pixel modules may be varied in accordance with teachings with the present inventions to provide the desired scalable, full parallax autostereoscopic image.

If the cost of providing an individual 2D image source for each lenslet is too expensive, a larger FPD (not expressly shown) or a video screen (not expressly shown) may be divided into four equal regions and shared among four lenslet pixel modules 70. The schematic illustration for this would be similar to FIG. 10, only with each slave CPU 82 providing the desired 2D image input for four lenslets pixel modules 70 instead of three lenslet pixel modules 70.

Figure 11:
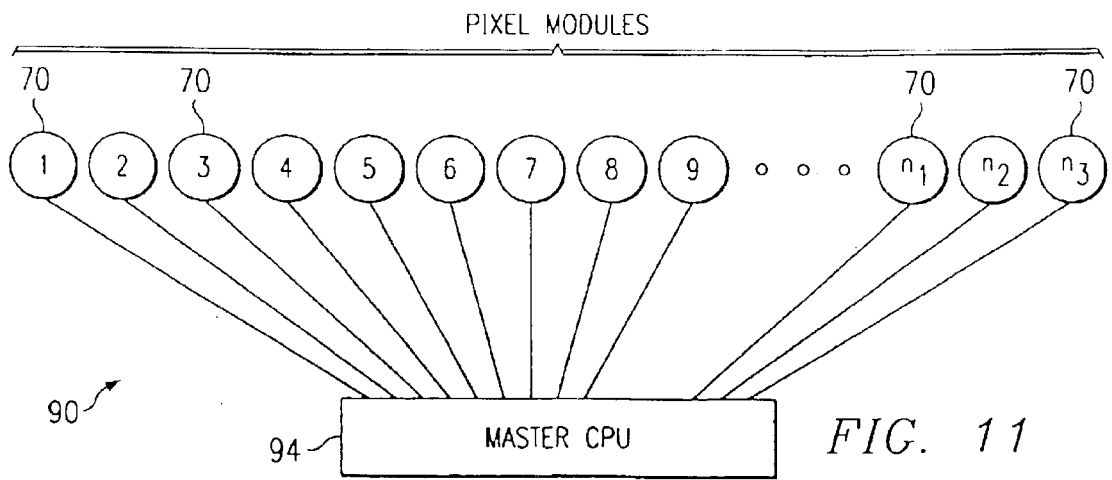
FIG. 11 is a schematic drawing with portions broken away of another display system having multiple lenslet pixel modules incorporating teachings of the present invention.

For some 3D electronic displays, each lenslet pixel module 70 may contain an internal CPU, a communications adapter, and video display circuitry so that each lenslet pixel module 70 may generate its own 2D image after being loaded with desired database and viewpoint information. FIG. 11 is a schematic diagram showing system 90 having a plurality of lenslet pixel modules 70 wherein each high resolution 2D source 78 preferably includes a respective internal CPU (not expressly shown), a communications adapter (not expressly shown) and associated video display circuitry (not expressly shown)along with the desired data base and viewpoint information. Master CPU 94 provides the desired digital data input to each lenslet pixel module 70. Consumer video game player systems which are available in compact sizes and at relatively low cost may be the basis for the electronic circuits and components for lenslet pixel modules 70. The benefits of this massively parallel computer processing approach would be in distribution of the computation load, relaxation of signal distribution requirements, and greatly simplified connectivity as shown in FIG. 11.

Lenslet Pixel Modules with Sensors or Detectors

Inclusion of a sensor or detector responsive to electromagnetic radiation from a real 3D object or scene within one or more lenslet pixel modules 70 will open up many interesting capabilities and uses for the associated full-parallax 3D display. As discussed later with respect to FIG. 12, a CCD sensor or a miniature video camera may be incorporated into a lenslet pixel module having a partially silvered mirror and additional optics to virtually superimpose a 3D output image and a 2D sensor array. A consequence of this approach may be output brightness attenuation. Also, possibly increased bulk of the CCD sensor may require pixel module engineering to optimize lenslet pixel module packing density.

The integration of a 2D sensor array into a 3D electronic display in accordance with teachings of the present invention will allow full-parallax 3D image information of real 3D objects, scenes, and people to be easily acquired. This rich level of 3D data has many potential military and civilian applications such as object measurement, virtual reality simulation source imagery, medical diagnostic information acquisition, and damage assessment information to name a few. Because the information could be acquired as moving images in real-time, the 3D data could be used as the basis for virtual-reality computer-human interaction. For example, multiple human observers could have simulated computer-graphic objects tracking their moving bodies in real time. Perhaps some observers could have their images appear on the associated 3D display in real time, while other observers choose to remain invisible.

Figure 12:
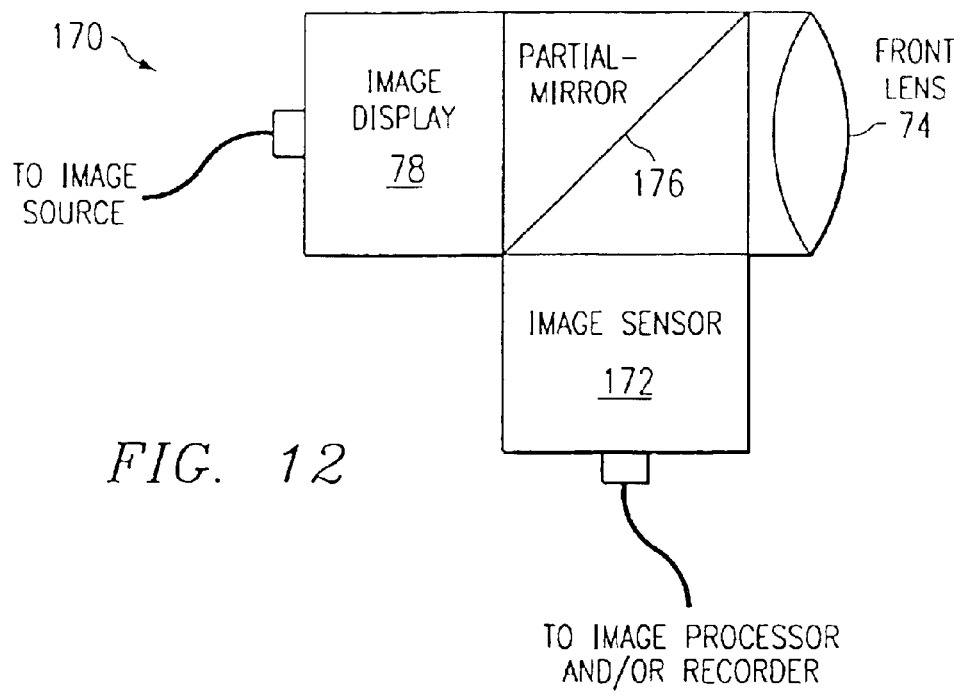
FIG. 12 is a schematic drawing showing a plan view with portions broken away of a lenslet pixel module having both a projector element and a sensor element.

FIG. 12 is a schematic drawing showing lenslet pixel module 170 with projection element 78 and sensor element 172 combined in accordance with teachings of the present invention. Lenslet pixel module 170 preferably includes both high resolution 2D image source 78 and sensor element or detector element 172. Partially silvered mirror 176 is preferably provided to optically couple both high resolution 2D image source 78 and sensor element 172 with lenslet 74. A wide variety of sensors or detectors which respond to electromagnetic radiation from a real 3D object or scene may be satisfactorily used as sensor element 172.

For some applications high resolution 2D image source 78 may be coupled with a source of moving video images. Sensor element 172 may be coupled with an appropriate recorder or a computer processing unit to record images corresponding with one or more real 3D objects (not expressly shown) disposed in front of lenslet 74.

Figure 13:
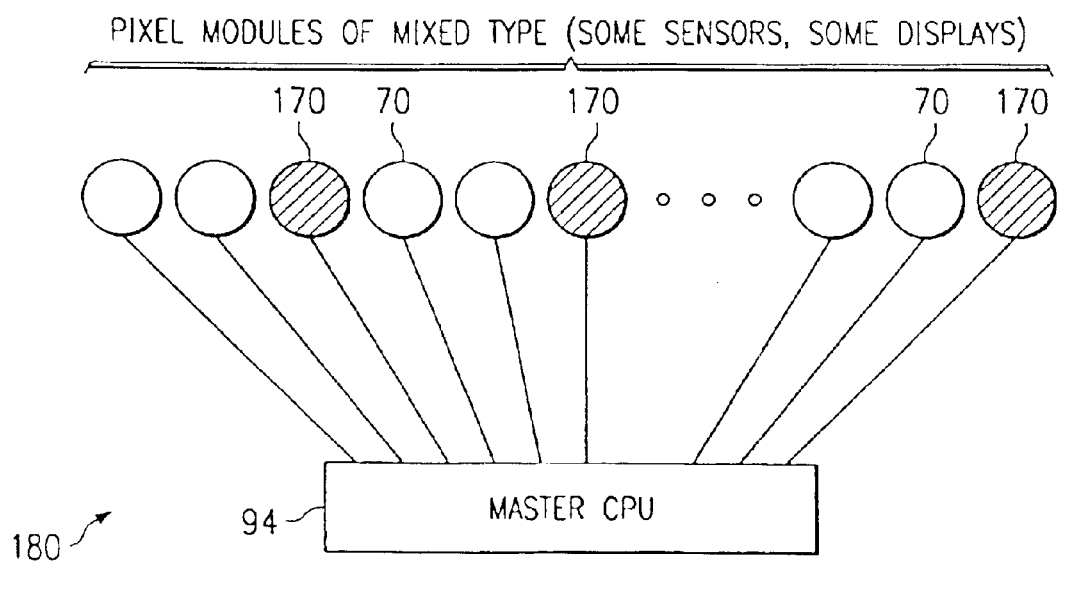
FIG. 13 is a schematic drawing with portions broken away showing still another display system having a selected number of lenslet pixel modules with respective projector elements and a selected number of lenslet pixel modules with respective sensor elements in accordance with teachings with the present inventions.

FIG. 13 is a schematic drawing showing various portions of system 180 which may be satisfactorily used to form an autostereoscopic image in accordance with teachings of the present invention. System 180 preferably includes a plurality of lenslet pixel modules 70 and a plurality of lenslet pixel modules 170. For purposes of describing various features of the present invention lenslet pixel modules 70 may also be referred to as projector modules. Lenslet pixel modules 170 may be described as combined projector/sensor modules. Master CPU 94 is preferably provided to communicate digital data corresponding with a desired 2D image to both lenslet pixel modules 70 and lenslet pixel modules 170. Master CPU 94 is also preferably operable to receive digital information from lenslet pixel modules 170 which correspond with one or more objects disposed in front of the associated lenslets 74.

For some applications, system 180 may be formed from a plurality of lenslet pixel modules 70 having associated high resolution 2D image sources 78 or projector elements 78 and a plurality of lenslet pixel modules or sensor modules having only associated sensor elements. One example of such sensor modules (not expressly shown) may be formed by replacing projector element 78 of lenslet pixel module 70 as shown in FIG. 9 with a desired sensor or detector element. System 180 may be satisfactorily formed with multiple projector modules, sensor modules and/or combined projector and sensor modules.

FIG. 14 is a schematic drawing showing system 190 which may be used to form an interactive autostereoscopic display in accordance with teachings of the present invention. System 190 preferably includes master CPU 94 coupled with a plurality of lenslet pixel modules 170. For this embodiment the resulting 3D array includes a plurality of lenslet pixel modules 170 having both a projector element or (high resolution 2D image source 78) and sensor element 172. FIG. 15 is a schematic drawing showing system 200 which may be used to form an interaction autostereoscopic display in accordance with teachings of the present invention. System 200 preferably includes master CPU 94 and a plurality of lenslet pixel modules 70 and 170. In addition, system 200 also preferably includes a plurality of lenslet pixel modules 70a which have a low resolution 2D image source (not expressly shown) and a plurality of sensor of lenslet sensor modules 170a which preferably include a low resolution sensor (not expressly shown).

Various features of the present invention have been described with respect to fly's eye lenslet sheet 52, associated lenslets 54 and fly's eye lenslet 74. However, it is well known in the art that a wide variety lens sheets and lenses may be satisfactorily used to form 3D autostereoscopic images. Lens sheets and lenslets satisfactory for use in forming 3D electronic displays in accordance with teachings of the present invention may be fabricated using refractive methods or diffractive methods. A wide variety of lens sheets having a suitable lens array formed on a first surface and a second generally smooth flat surface disposed opposite from the first surface may be satisfactorily used to form lenslet pixel modules in accordance with the teachings of the present invention. The lenslets may be cylindrical, convex, concave, gradient index, diffractive, refractive, holographic optical elements or any other suitable prism which will form a full parallax 3D image.

For some 3D displays a plurality of sensors or detectors (not expressly shown) may be dispersed within an array lenslet pixel modules having only projector elements. The lenslet pixel modules may cooperate with each other to form a projector array. The sensor elements may also cooperate with each other to form a sensor array. The lenslet pixel modules and each sensor may include a fly's eye lenslet. For some applications, the sensor array may have a focal plane which corresponds approximately with a focal plane associated with the projector array. For other applications the sensor array may have a focal plane oriented substantially different from the focal plane of the projector array. For still other applications one or more of the sensors may have a lenslet with a configuration different from the projector array. Also, the lenslet pixel modules in the projector array may have different lenslets. The sensor array may cooperate with the projector array to allow an observer to interact with a 3D image formed by the projector array.

The number of potential applications which could use a large 3D display incorporating teachings of the present invention is vast. It is expected that many people with virtual reality applications would be potentially interested in 3D electronic displays incorporating teachings of the present invention because of its unique aspects and capabilities. Some potential applications include mission planning, reconnaissance, damage assessment, scene analysis, education, training, simulations, mechanical and electrical engineering, cartography & terrain imaging, geoscience, seismic research, medical imagery, product design, architecture, space planning, advertising, scientific visualization and teleconferencing.

Although the present invention and its advantages have been described in detail, it should be understood that various changes, substitutions and alterations may be made thereto without departing from the spirit and scope of the present invention as defined in the following claims.

What is claimed is:

1. Apparatus for displaying a three-dimensional image, comprising:
    a plurality of lenslet pixel modules with each module defined in part by a respective lenslet;
    each lenslet pixel module corresponding with and operable to produce a complete 3D pixel of the three-dimensional image;
    a plurality of two-dimensional moving image sources associated with and forming a portion of the lenslet pixel modules; and
    the lenslet pixel modules cooperating with each other to form a projector array for displaying the three-dimensional image.

2. The apparatus of claim 1 further comprising a fly's eye lens sheet having a plurality of fly's eye lenslets disposed thereon to provide the respective lenslet for each lenslet pixel module.

3. The apparatus of claim 1 further comprising at least one lenslet pixel module having a partially silvered mirror and a sensor disposed adjacent thereto.

4. The apparatus of claim 1 further comprising at least one lenslet pixel module having a high resolution two-dimensional digital image source associated with and forming a portion of the at least one lenslet pixel module.

5. The apparatus of claim 1 further comprising:

the plurality of lenslet pixel modules disposed in an array relative to each other;

at least two of the lenslet pixel modules having a respective sensor disposed therein;

the sensors cooperating with each other to form a sensor array having a first focal plane;

the plurality of fly's eye lenslets associated with the lenslet pixel modules cooperating with each other to form a projector array having a second focal plane; and the focal plane of the sensor array corresponding generally with the focal plane of the projector array.

6. The apparatus of claim 5 wherein at least one sensor comprises a video sensor.

7. The apparatus of claim 5 wherein at least one sensor comprises a charge coupled device.

8. The apparatus of claim 1 wherein the three-dimensional image is full parallax.

9. The apparatus of claim 1 further comprising:

the plurality of lenslet pixel modules disposed in an array relative to each other;

at least two of the lenslet pixel modules having a respective sensor disposed therein; and the sensors cooperating with each other to form a sensor array for sensing at least one real three-dimensional object.

10. The apparatus of claim 9 further comprising a central processing unit operable to receive information from the sensor array and to provide information to the projector array to allow interaction between the at least one real three-dimensional object and the three-dimensional image.

11. The apparatus of claim 1 wherein at least one of the plurality of two-dimensional moving image sources is selected from the group consisting of a cathode ray tube, a liquid crystal display, digital micro device mirror, a flat panel display, a respective section of a diffuser backlit by a video projection system, a microelectronicmechanical system, or a light emitting diode.

12. The apparatus of claim 1 further comprising:

the plurality of lenslet pixel modules disposed in an array relative to each other; and a high resolution two-dimensional image source associated with each respective lenslet pixel module.

13. The apparatus of claim 1 further comprising:

the plurality of lenslet pixel modules disposed in an array relative to each other;

a two-dimensional high resolution image source associated with two or more lenslet pixel modules; and each of the lenslet pixel modules associated with a dedicated region of the respective high resolution two-dimensional image source.

14. The apparatus of claim 1 further comprising:

the plurality of lenslet pixel modules disposed in an array relative to each other;

a plurality of sensors interspersed within the array of lenslet pixel modules;

the sensors cooperating with each other to form a sensor array having a first focal plane; and the lenslet pixel modules cooperating with each other such that the projector array has a second focal plane.

15. The apparatus claim 14 wherein the first focal plane corresponds generally with the second focal plane.

16. The apparatus of claim 14 wherein the first focal plane has an orientation different from the second focal plane.

17. A system for presenting a scalable, autostereoscopic image comprising:

a plurality of lenslet pixel modules with each module defined in part by a respective lenslet;

each lenslet pixel module corresponding with and operable to produce a complete 3D pixel of the autostereoscopic image;

a plurality of two-dimensional image sources associated with and forming a portion of each lenslet pixel module; and at least one computer processing unit providing an input to at least one of the plurality of two-dimensional image sources.

18. The system of claim 17 wherein the input supplied to the two-dimensional image sources comprises digital data corresponding to a two-dimensional image.

19. The system of claim 17 wherein the input supplied to the two-dimensional image source comprises a moving video image.

20. The system of claim 17 wherein the autostereoscopic image is full parallax.

21. The system of claim 17 further comprising:

a plurality of first computer processing units having at least one video output channel to supply video images to the two-dimensional image sources;

a two-dimensional image source coupled with one of the first computer processing units; and a master computer processing unit coupled with and supplying data to the first computer processing units.

22. The system of claim 17 further comprising:

a plurality of sensors with each sensor disposed within one of the lenslet pixel modules; and each sensor coupled with the computer processing unit to provide information to the computer processing unit concerning a real object in front of the lenslet pixel modules.

23. The system of claim 17 wherein the lenslets further comprise a plurality of lens selected from the group consisting of cylindrical, convex, concave, gradient index, diffractive, refractive, holographic optical elements and other prisms which form an autostereoscopic image.

24. The system of claim 17 further comprising:

a plurality of sensors with each sensor coupled with the computer processing unit to provide information to the computer processing unit concerning a real object in front of the lenslet pixel modules;

a portion of the sensors providing high resolution information about the real object; and a portion of the sensors providing low resolution information about the real object.

25. A method for presenting an autostereoscopic image comprising:

combining a plurality of high resolution two-dimensional digital image sources with a plurality of lenslet pixel modules with each pixel module having a respective fly's eye lenslet and being operable to produce a complete 3D pixel; and projecting light from each digital image source through the respective lenslet pixel module to form the autostereoscopic image from a plurality of 3D pixels.

26. The method of claim 25 further comprising installing at least two sensors within respective lenslet pixel modules for use in sensing at least one real object disposed in front of the lenslet pixel modules.

27. The method of claim 25 further comprising:

sensing at least one real object disposed in front of the lenslet pixel modules with the sensors; and combining information received from the sensors concerning the at least one real object with information supplied to the high resolution two-dimensional image sources to allow interaction between the at least one real object and the full-parallax autostereoscopic image produced by the lenslet pixel modules.

28. The method of claim 25 wherein the autostereoscopic image is full parallax.

29. A lenslet pixel module for projecting light and sensing light comprising:

a two-dimensional image source operably coupled with a respective lenslet whereby a portion of a selected two-dimensional image may be projected from the lenslet to form at least one complete 3D pixel of an autostereoscopic image;

a sensor disposed within and forming a portion of the lenslet pixel module; and the sensor operably coupled with a fly's eye lenslet to allow the sensor to detect at least one real object in front of the lenslet pixel module.

30. The lenslet pixel module of claim 29 wherein the sensor further comprises a digital video camera.

31. The lenslet pixel module of claim 29 further comprising a portion of a full parallax three-dimensional electronic display.

32. The lenslet pixel module of claim 29 further comprising the two-dimensional image source operable to form a portion of the image and the sensor operable to detect electromagnetic radiation from the at least one real object at substantially the same time.

* * * * *